(12) United States Patent
Sekimoto

(10) Patent No.: US 11,539,218 B2
(45) Date of Patent: Dec. 27, 2022

(54) ELECTRONIC DEVICE AND CONTROL METHOD

(71) Applicant: CANON KABUSHIKI KAISHA, Tokyo (JP)

(72) Inventor: Ryota Sekimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 17/103,356

(22) Filed: Nov. 24, 2020

(65) Prior Publication Data
US 2021/0167615 A1     Jun. 3, 2021

(30) Foreign Application Priority Data

Nov. 29, 2019   (JP) ............................. JP2019-217499

(51) Int. Cl.
*H02J 7/00*       (2006.01)

(52) U.S. Cl.
CPC ...... *H02J 7/00032* (2020.01); *H02J 7/00034* (2020.01); *H02J 7/00036* (2020.01); *H02J 7/0047* (2013.01)

(58) Field of Classification Search
CPC .. H02J 7/0047; H02J 7/00032; H02J 7/00034; H02J 7/00036

USPC ........................................ 320/134, 157, 162
See application file for complete search history.

(56) References Cited

U.S. PATENT DOCUMENTS

| | | | |
|---|---|---|---|
| 5,557,190 A  * | 9/1996 | Brotto ............... | H02J 7/007184 320/148 |
| 9,748,782 B1 * | 8/2017 | Sheng ................. | H02J 7/00308 |
| 2011/0025264 A1 * | 2/2011 | Mochida ............... | H01M 10/48 320/108 |
| 2013/0038293 A1 | 2/2013 | Seman, Jr. | |
| 2019/0067955 A1 * | 2/2019 | Sergyeyenko .......... | H02J 7/007 |

FOREIGN PATENT DOCUMENTS

JP          2015-070777 A       4/2015

* cited by examiner

*Primary Examiner* — Edward Tso
*Assistant Examiner* — Aaron Piggush
(74) *Attorney, Agent, or Firm* — Canon U.S.A., Inc. IP Division

(57) ABSTRACT

An electronic device includes a charging unit that charges a battery with power supplied from an external device, and a control unit that controls a communication unit of the electronic device such that a communication interval from a start of charging the battery by the charging unit until a battery voltage exceeds a predetermined threshold is shorter than a communication interval after the battery voltage exceeds the predetermined threshold, in a case where power is received from the external device.

8 Claims, 11 Drawing Sheets

FIG. 6

| BATTERY VOLTAGE [V] | REQUEST VOLTAGE [V] | TIME THRESHOLD [SECOND(S)] |
|---|---|---|
| 5.40 | 5.5 | 0.1 |
| 5.41 | 5.5 | 0.1 |
| 5.42 | 5.5 | 0.1 |
| 5.43 | 5.5 | 0.1 |
| 5.44 | 5.5 | 0.1 |
| 5.45 | 5.5 | 0.1 |
| 5.46 | 5.6 | 0.1 |
| 5.47 | 5.6 | 0.1 |
| 5.48 | 5.6 | 0.1 |
| 5.49 | 5.6 | 0.1 |
| 5.50 | 5.6 | 0.1 |
| 5.51 | 5.6 | 0.1 |
| 5.52 | 5.6 | 0.1 |
| 5.53 | 5.6 | 0.1 |
| 5.54 | 5.6 | 0.1 |
| 5.55 | 5.6 | 0.1 |
| 5.56 | 5.7 | 0.1 |
| 5.57 | 5.7 | 0.1 |
| 5.58 | 5.7 | 0.1 |
| 5.59 | 5.7 | 0.1 |
| 5.60 | 5.7 | 0.1 |
| — | — | — |
| — | — | — |
| — | — | — |
| 6.90 | 7.0 | 1 |
| 6.91 | 7.0 | 1 |
| 6.92 | 7.0 | 1 |
| 6.93 | 7.0 | 1 |
| 6.94 | 7.0 | 1 |
| — | — | — |
| — | — | — |
| — | — | — |
| 8.35 | 8.4 | 5 |
| 8.36 | 8.4 | 5 |
| 8.37 | 8.4 | 5 |
| 8.38 | 8.4 | 5 |
| 8.39 | 8.4 | 5 |

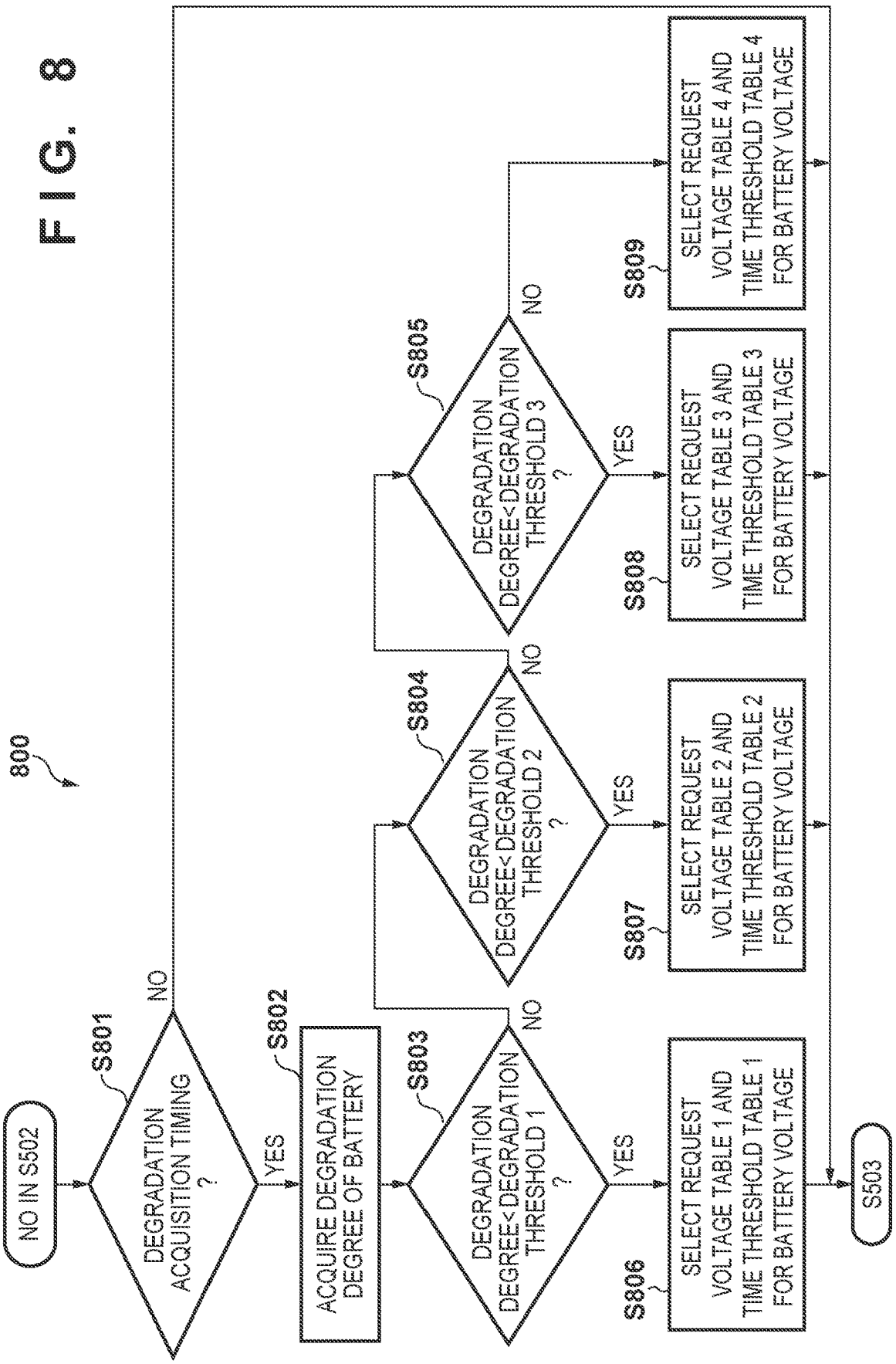

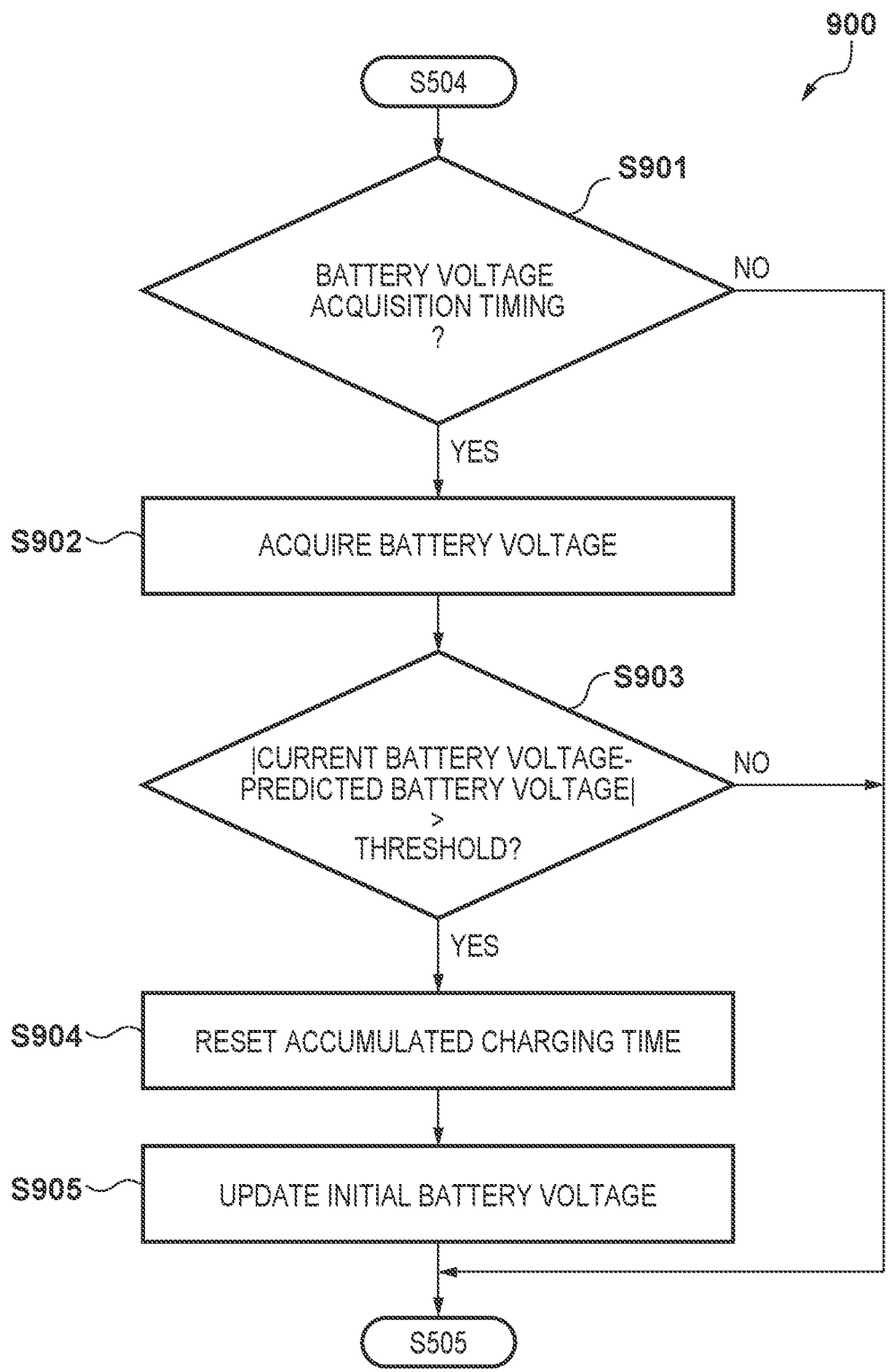

ELECTRONIC DEVICE AND CONTROL METHOD

BACKGROUND

Field

Aspects of the present disclosure generally relate to an electronic device that charges a battery with power supplied from an external device and a method of controlling such an electronic device.

Description of the Related Art

Japanese Patent Laid-Open No. 2015-070777 describes a method in which, in a non-contact power transmission system that performs constant current charging and constant voltage charging, a communication frequency when the constant voltage charging is performed is higher than a communication frequency when the constant current charging is performed.

Japanese Patent Laid-Open No. 2015-070777 describes method in which a communication frequency when the constant-voltage charging is performed is higher than a communication frequency when the constant-current charging is performed. However, this method alone cannot solve a problem of reducing a time for charging a battery.

SUMMARY

According to various embodiments, there is provided techniques, mechanisms or the like that can shorten the time for charging a battery.

According to various embodiments, an electronic device is provided that includes a charging unit that charges a battery with power supplied from an external device; and a control unit that controls a communication unit of the electronic device such that a communication interval from a start of charging the battery by the charging unit until a battery voltage exceeds a predetermined threshold is shorter than a communication interval after the battery voltage exceeds the predetermined threshold, in a case where power is received from the external device.

According to various embodiments, an electronic device is provided that includes a charging unit that charges a battery with power supplied from an external device; and a control unit that controls a communication unit of the electronic device so that a communication interval for receiving power from the external device becomes a predetermined communication interval, in a case where a change amount of battery voltage exceeds a predetermined value, and controls the communication unit so that a communication interval for receiving power from the external device becomes shorter than the predetermined communication interval, in a case where the change amount of battery voltage does not exceed the predetermined value.

According to various embodiments, a method is provided which includes charging a battery by power supplied from an external device; and controlling a communication unit of the electronic device such that a communication interval from a start of charging the battery until the battery voltage exceeds a predetermined threshold is shorter than a communication interval after the battery voltage exceeds the predetermined threshold, in a case where power is received from the external device.

According to various embodiments, a method is provided which includes charging a battery by power supplied from an external device; controlling a communication unit of the electronic device such that a communication interval for receiving power from the external device becomes a predetermined communication interval, in a case where a change amount of battery voltage exceeds a predetermined value; and controlling the communication unit such that a communication interval for receiving power from the external device is shorter than the predetermined communication interval, in a case where the change amount of battery voltage does not exceed the predetermined value.

Further aspects of embodiments of the present disclosure will become apparent from the following embodiments.

BRIEF DESCRIPTION OF THE DRAWINGS

FIG. 6 is a diagram illustrating an example of a relationship between a request voltage and a time threshold with respect to a battery voltage according to one embodiment.

FIG. 8 is a flowchart illustrating an example of a control process when the CCCV charging is performed according to one embodiment.

FIG. 9 is a flowchart illustrating an example of a process of comparing a predicted battery voltage with a current battery voltage according to one embodiment.

DESCRIPTION OF THE EMBODIMENTS

Exemplary embodiments, features, and aspects of the disclosure will be described below with reference to the drawings. However, the scope of the disclosure is not limited to the following embodiments.

First Embodiment

Figure 1:
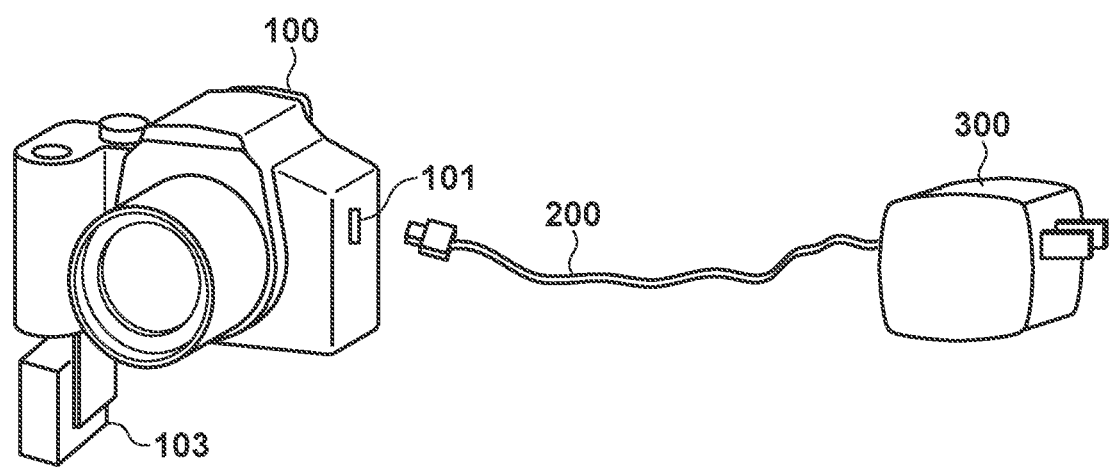
FIG. 1 is a diagram illustrating an example of a system configuration of an electronic device 100 and a charger 300 according to a first embodiment.

FIG. 1 is a diagram illustrating an example of a system configuration of an electronic device 100 and a charger 300 according to a first embodiment. In the following embodiments, the electronic device 100 is a device that can operate as, for example, a digital camera, but the electronic device 100 is not limited to the digital camera, and may be an apparatus that can operate as, for example, a smartphone or a tablet terminal.

The electronic device 100 is removable from a battery 103, and operates with power supplied from the battery 103.

The electronic device 100 includes a connection unit 101 to which an external device can be connected. The external device connected to the connection unit 101 is, for example, a charger 300 which is a power supply device.

In addition, the electronic device 100 can communicate with the charger 300 via the connection unit 101 and receive power from the charger 300. The electronic device 100 is a power receiving device that is capable of charging the battery 103 by power received from the charger 300. In addition, the electronic device 100 may operate by power supplied from the charger 300 instead of power supplied from the battery 103. The electronic device 100 and the charger 300 can supply power from the charger 300 to the electronic device 100 using a function called PPS (Programmable Power Supply) of USB PD (Power Delivery) 3.0.

In the PPS, a communication is performed via a Configuration Channel (CC) terminal of a USB Type-C connector, and a power supply can be performed by changing a voltage or a current in fine steps in response to a power request of a predetermined voltage from the electronic device 100. The voltage supplied from the charger 300 to the electronic device 100 by the PPS is determined by the PPS-compliant communication performed by the electronic device 100 and the charger 300 (hereinafter referred to as PPS communication). The electronic device 100 can notify the charger 300 of the requested voltage by the PPS communication. The charger 300 can perform a constant current constant voltage (Constant Current Constant Voltage: CCCV) charging by appropriately changing the request voltage as the charging time elapses. The CCCV charging is a method in which a CC (a constant current) charging is performed at a constant current partway, and a CV (a constant voltage) charging is performed at a constant voltage when a predetermined voltage is reached.

Figure 2:
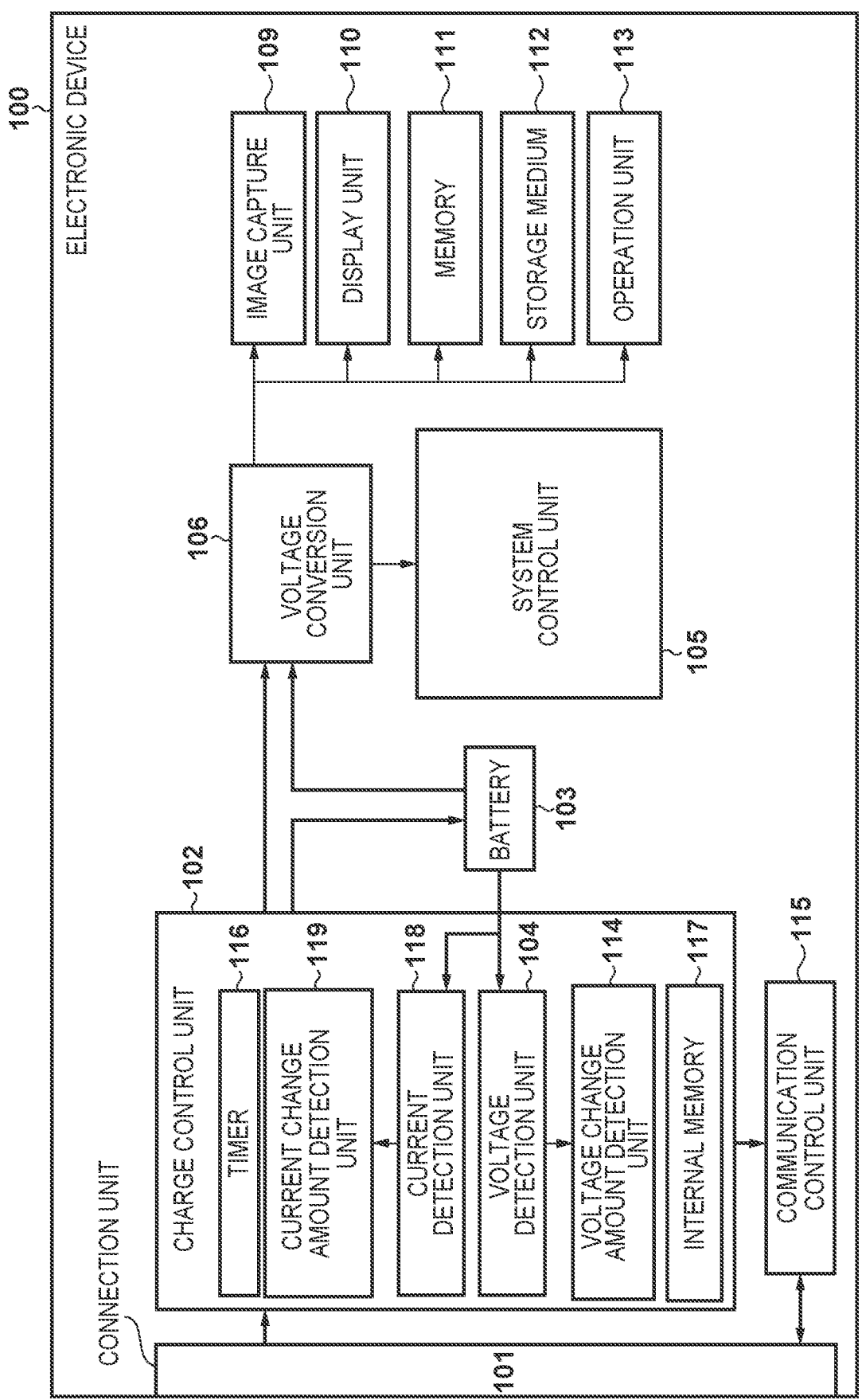
FIG. 2 is a block diagram illustrating components of the electronic device 100 according to one embodiment.

FIG. 2 is a block diagram illustrating components of the electronic device 100.

The connection unit 101 is an interface that is capable of communicating with the charger 300 and receiving power from the charger 300. The connection unit 101 is, for example, a USB Type-C connector, and is connected to the charger 300 via a USB Type-C cable 200.

A charge control unit 102 supplies power received from the charger 300 via the connection unit 101 to the components of the electronic device 100 via the voltage detection unit 104. In addition, the charge control unit 102 can charge the battery 103 by power received from the charger 300. Further, the charge control unit 102 can supply power supplied from the battery 103 to the components of the electronic device 100.

The battery 103 supplies power that is necessary for operating the electronic device 100. The battery 103 is removable from the electronic device 100. The battery 103 is charged by power received from the charger 300 via the connection unit 101.

A voltage detection unit 104 can detect a voltage value of power supplied from the battery 103 or a voltage value of power supplied from the charger 300 via the connection unit 101.

A system control unit 105 is a microcomputer that controls the components of the electronic device 100 in accordance with a program.

A voltage conversion unit 106 steps up or down a voltage of power supplied via the battery 103 or the connection unit 101 to convert the voltage of power into a voltage that is suitable for the components of the electronic device 100.

An image capture unit 109 converts the object light formed by the lens included in the image capture unit 109 into signal, performs a noise reduction process and the like, and outputs resultant data as image data. The image data captured by the image capture unit 109 is stored in a memory 111, and then given to a predetermined calculation in the system control unit 105, and recorded in a recording medium 112.

A display unit 110 displays a view finder image at the time of shooting, displays captured image data, and displays a GUI for operations.

The memory 111 is a volatile memory such as a RAM for temporarily storing programs, data, and image data required for various processes by the system control unit 105, or a nonvolatile memory such as an EEPROM that is capable of electrically erasing and recording these data.

The recording medium 112 can record an image file obtained by compressing the image data output from the image capture unit 109 into a predetermined data format. The recording medium 112 includes a hard disk, a memory card, a USB flash memory, or the like. The recording medium 112 is removable from the electronic device 100.

An operation unit 113 accepts an instruction to the electronic device 100 from a user, and notifies the system control unit 105 of an instruction signal. The operation unit 113 includes, for example, a power button for the user giving an instruction to turn on or off the power of the electronic device 100, and a release switch for the user giving an instruction of shooting. The operation unit 113 also includes a reproduction button for the user giving an instruction to reproduce image data, a mode dial for the user instructing a shooting mode of the electronic device 100, a touch panel formed on the display unit 110, or the like. The release switch has a switch SW1 and switch SW2. When the release switch gets into a so-called half-pressed state, the switch SW1 is turned ON. Accordingly, the system control unit 105 accepts an instruction to prepare for shooting such as AF (automatic focus) process and AE (automatic exposure) process. When the release switch gets into a so-called full pressed state, the switch SW2 is turned ON. Accordingly, the system control unit 105 accepts an instruction for performing shooting.

A voltage change amount detection unit 114 calculates a change amount of voltage supplied from the battery 103 or the connection unit 101 based on the voltage value detected by the voltage detection unit 104.

A communication control unit 115 can communicate with the charger 300 via the connection unit 101. The communication control unit 115 controls the PPS communication with the charger 300, and transmits a request voltage calculated by the charge control unit 102 to the charger 300 via the connection unit 101.

A timer 116 measures a communication interval or the like in the PPS communication for transmitting the request voltage, which will be described later.

An internal memory 117 is a ROM that stores a table of the request voltage with respect to a battery voltage and a table of the time threshold with respect to the battery voltage.

A current detection unit 118 can detect a current supplied via the connection unit 101 (a charging current of the battery 103) or a current output from the battery 103.

A current change amount detection unit 119 calculates a change amount of current supplied from the battery 103 or the connection unit 101 based on the current detected by the current detection unit 118.

Note that in FIG. 2, the voltage detection unit 104, the voltage change amount detection unit 114, the timer 116, the internal memory 117, the current detection unit 118, and the current change amount detection unit 119 are configured to be included in the charge control unit 102, but may be configured separately from the charge control unit 102.

<PPS Communication>

Next, the operations of the electronic device 100 and the charger 300 during the PPS communication will be described with reference to FIG. 3.

Figure 3:
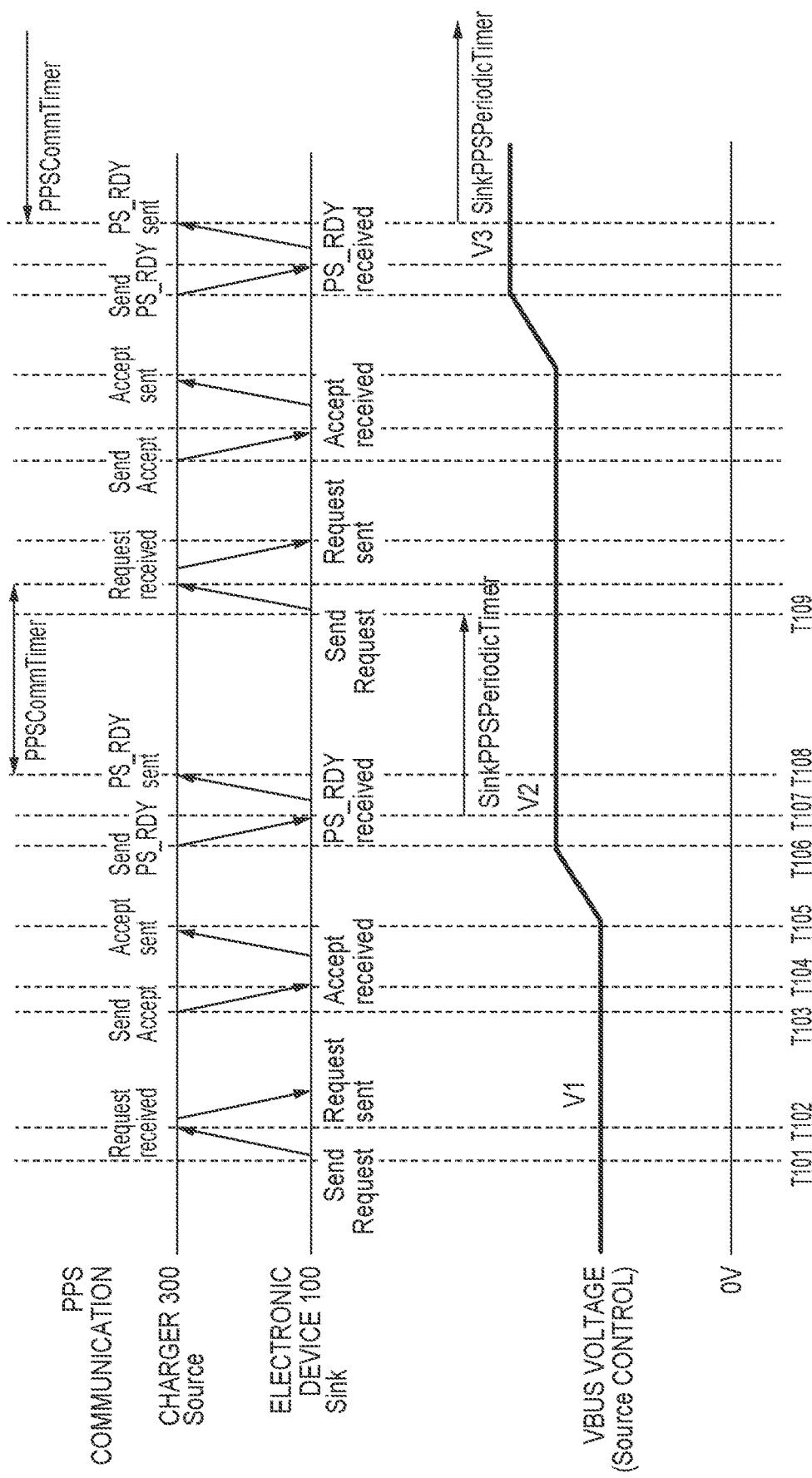
FIG. 3 is a time chart illustrating an example of an operation when PPS communication is performed according to one embodiment.

FIG. 3 is a time chart for illustrating an example of an operation when the electronic device 100 and the charger 300 perform the PPS communication via the CC terminal of the USB Type-C.

In FIG. 3, the start position of the arrow of the PPS communication corresponds to a transmission side of the communication, and the end position thereof corresponds to a reception side of the communication. The VBUS voltage is output from the charger 300 as a source device, and the electronic device 100 as a sink device receives power from the VBUS terminal of the USB Type-C. FIG. 3 shows the example of the operation of the electronic device 100 after receiving, from the charger 300, Source Capabilities including a PDO (Power Data Object) indicating a voltage and a current that can be output after the VBUS voltage is output.

In T101, the electronic device 100 transmits "Request" including the voltage desired to request or the like to the charger 300. In the PPS, the output voltage can be requested to the charger 300 in a minimum unit of 20 mV.

In T102, the charger 300 receives the "Request" from the electronic device 100, and transmits to the electronic device 100 that the "Request" has been correctly received.

In T103, the charger 300 confirms the content of "Request" from the electronic device 100, and if active, transmits "Accept", and in T104, the electronic device 100 receives the "Accept".

In T105, the electronic device 100 transmits to the charger 300 that the "Accept" has been correctly received. Then, the charger 300 starts changing the current VBUS voltage V1 to the voltage V2 requested by the electronic device 100.

In T106, when the change from VBUS voltage V1 to the voltage V2 is completed, the charger 300 transmits "PS_RDY" to the electronic device 100.

In T107, the electronic device 100 receives the "PS_RDY" and transmits to the charger 300 that the "PS_RDY" has been correctly received, and starts "SinkPPSPeriodicTimer". In the PPS communication, it is necessary for the sink device to periodically transmit "Request" to the source device. The maximum value of "SinkPPSPeriodicTimer" is defined by a standard of 10 seconds, and the sink device transmits "Request" to the source device every time the maximum value is defined by "SinkPPSPeriodicTimer".

In T108, the charger 300 is notified from the electronic device 100 that the "PS_RDY" is correctly received, and then starts "PPSCommTimer". In the PPS communication, it is necessary for the sink device to periodically receive "Request" from the sink device. The minimum value of "PPSCommTimer" is 12 seconds and the maximum value of "PPSCommTimer" is 15 seconds, which is defined by the standard, and when the "PPSCommTimer" is timed out, the source device issues a HardReset signal.

When the time of "SinkPPSPeriodicTimer" has elapsed from T107, in T109, the electronic device 100 transmits the "Request" including the voltage desired to request or the like again. In the PPS, the above-described communication and voltage change are repeated.

Figure 4:
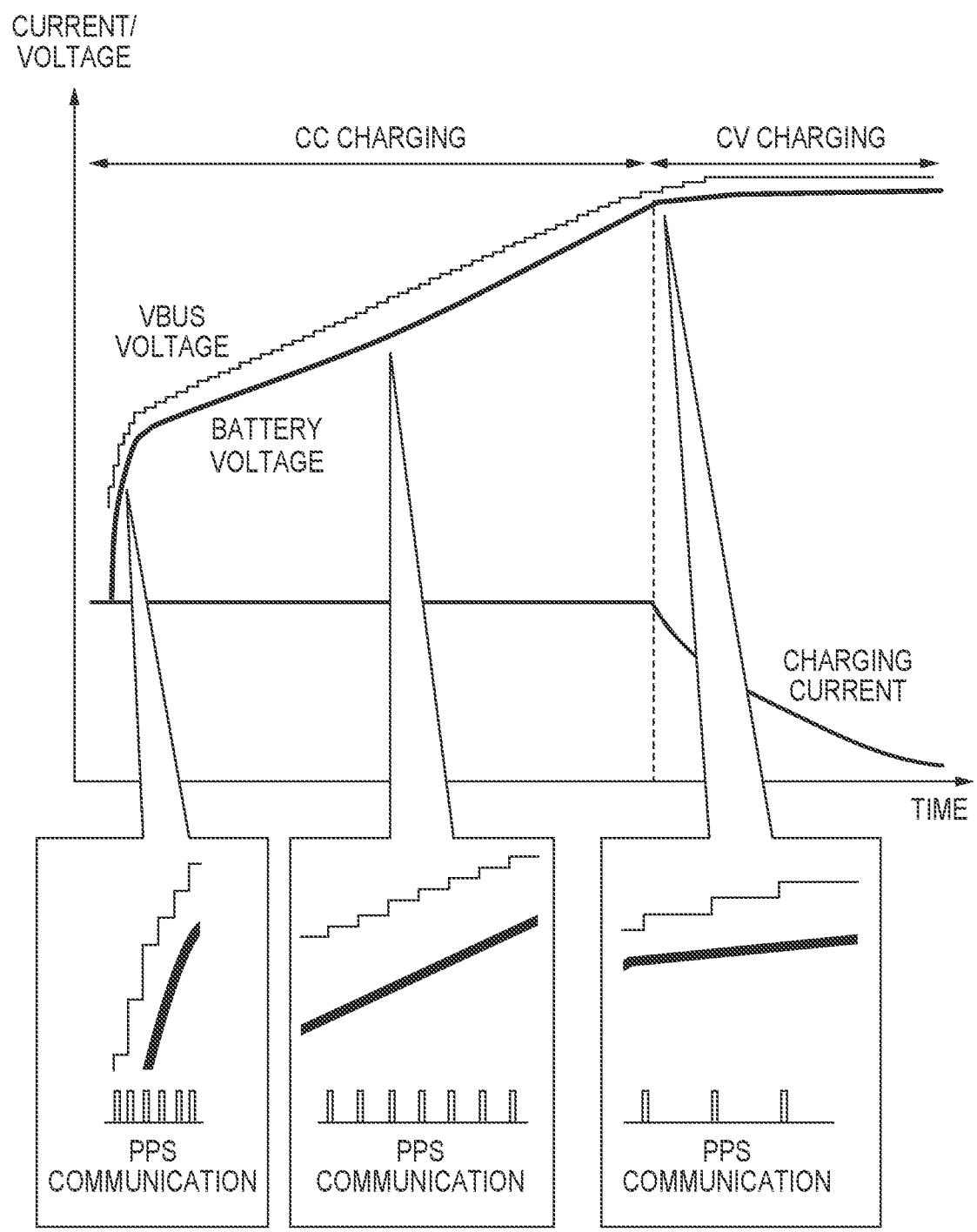
FIG. 4 is a diagram illustrating an example of a charging curve during a CCCV charging according to one embodiment.

FIG. 4 shows an example of temporal changes in VBUS voltage, battery voltage, and charging current when the electronic device 100 and the charger 300 are connected by a USB Type-C cable and the battery 103 is charged by the PPS.

In the PPS, the VBUS voltage is changed in fine steps in accordance with the battery voltage as shown in FIG. 4, thereby suppressing power loss when the battery 103 is charged.

In the CCCV charging by the PPS communication, the PPS communication is performed every 10 seconds that is determined by the PPS standard to update the request voltage, but during the CC charging, the battery voltage is saturated in a time shorter than 10 seconds, and thus the charging time is extended. Therefore, in the first embodiment, the communication interval of the PPS communication when the CCCV charging is performed is variably controlled, and the communication interval of the PPS communication is narrowed in a period where the gradient of the charging curve is steep, thereby suppressing the extension of the charging time.

FIG. 4 shows an example in which the communication interval of the PPS in the period around the start of the CC charging is narrower (shorter) than the communication interval of the PPS in the intermediate period of the CC charging. Since the gradient of the charging curve is particularly steep in the period around the start of the CC charging, the request voltage is frequently updated by narrowing the communication interval of the PPS. Thus, the charging time around the start of the CC charging can be made shorter than the charging time by the conventional PPS communication.

The communication interval of the PPS may be changed between the constant current (CC) charging period and the constant voltage (CV) charging period. FIG. 4 shows an example in which the communication interval of the PPS during the CC charging period is narrower (shorter) than the communication interval of the PPS during the CV charging period. Since the gradient of the charging curve is steeper in the CC charging period than in the CV charging period, the communication interval of the PPS is narrowed to frequently update the request voltage. As a result, the charging time of the CC charging period can be made shorter than the charging time of the CV charging period.

In this manner, by variably controlling the communication interval of the PPS in accordance with the gradient of the charging curve, it is possible to suppress the extension of the charging time when the CCCV charging is performed.

Next, a control process when the battery 103 is charged will be described with reference to a flowchart of FIG. 5.

Figure 5:
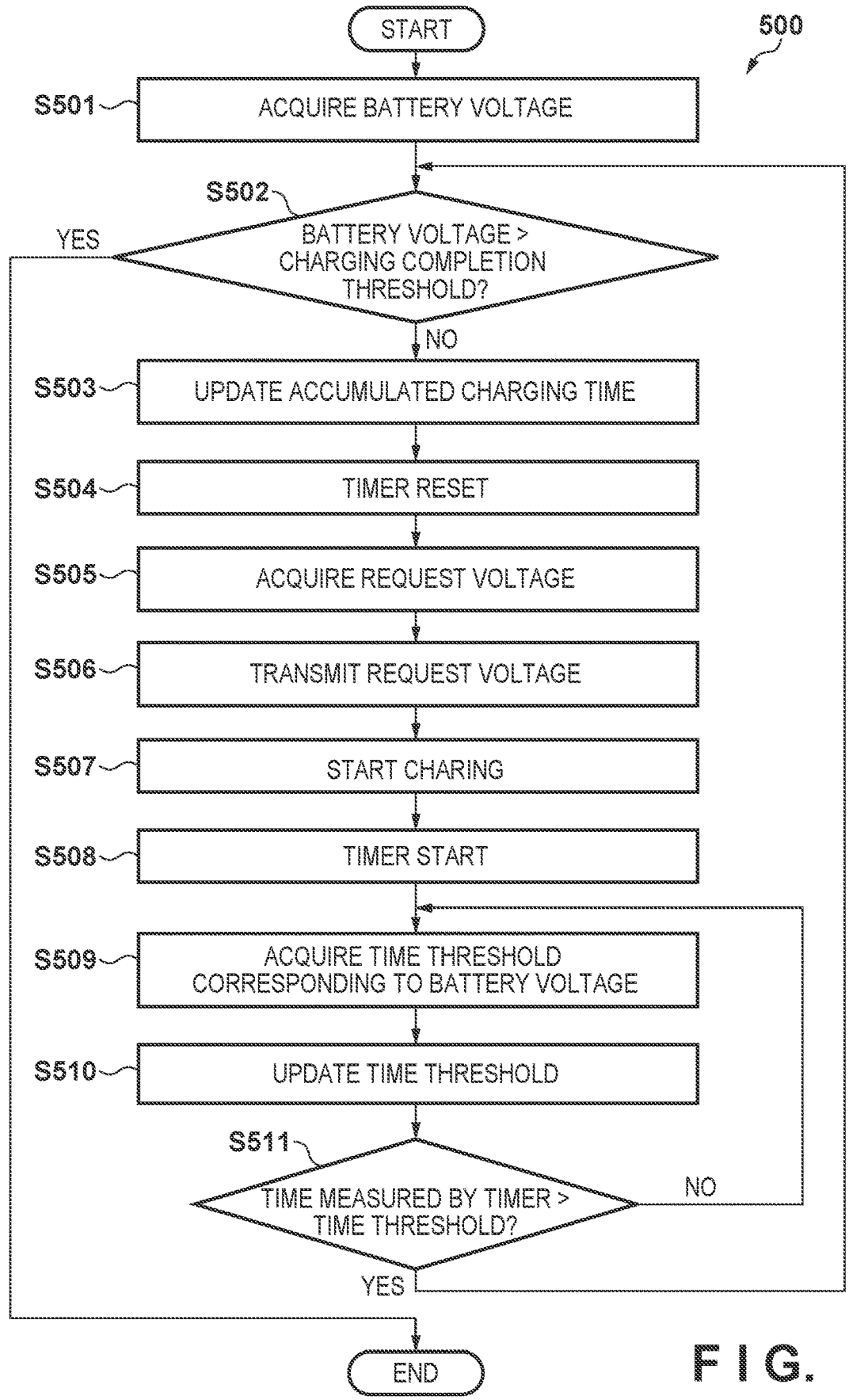
FIG. 5 is a flowchart illustrating an example of a control process when the CCCV charging is performed according to one embodiment.

Note that the process 500 of FIG. 5 is controlled by the charging control unit 102 of the electronic device 100 executing a program stored in the internal memory 117. The process 500 is started when the charger 300 is connected to the connection unit 101 and the PPS communication is started.

In step S501, the voltage detection unit 104 acquires the battery voltage of the battery 103. The battery voltage is an analog voltage, but is converted into a digital value by an analog-to-digital conversion function of the voltage detection unit 104. The converted digital value is stored in the internal memory 117 as an initial battery voltage.

In step S502, the charge control unit 102 determines whether or not the battery voltage of the battery 103 exceeds a charge completion threshold based on information from the voltage detection unit 104. If the charge control unit 102 determines that the battery voltage of the battery 103 exceeds the charging completion threshold, the charge control unit 102 determines that the charging has been completed, and ends the charging of the battery 103. If the charge control unit 102 determines that the battery voltage of the battery 103 does not exceed the charging completion threshold, the charge control unit 102 advances the process 500 to step S503.

In step S503, the charge control unit 102 updates an accumulated charging time. The accumulated charging time is time information obtained by sequentially adding the time from the PPS communication measured by the timer 116 to the next PPS communication and accumulating the elapsed time from the start of charging. At the start of charging, the accumulated charging time is zero.

In step S504, the charge control unit 102 transmits reset signal to the timer 116. Accordingly, the measurement time of the timer 116 is reset.

In step S505, the charge control unit 102 calculates a request voltage for the charger 300. The charge control unit 102 previously stores a table of the request voltage for the battery voltage in the internal memory 117, and reads the request voltage corresponding to the current battery voltage from the internal memory 117. The table is a table showing the relationship between the VBUS voltage and the battery voltage in FIG. 4. In FIG. 4, if the value of the battery voltage is uniquely determined, the VBUS voltage corresponding thereto is also uniquely determined. The value of the VBUS voltage uniquely determined with respect to the current battery voltage is the voltage to be requested. As described above, the table of the battery voltage and the VBUS voltage (=request voltage) is generated based on the charging curve to be followed when the CCCV charging is performed, and the table is stored in the internal memory 117, whereby the request voltage corresponding to the current battery voltage can be read from the internal memory 117.

Note that as a method of acquiring the current battery voltage, for example, a value in which the battery voltage is detected again by the voltage detection unit 104 may be used. As another method, the predicted value (predicted battery voltage) of the current battery voltage may be calculated using the initial battery voltage acquired in step S501 and the accumulated charging time updated in step S503. Since the charging curve performed by the charge control unit 102 is known as shown in FIG. 4, the current battery voltage can be predicted by knowing the initial battery voltage and the accumulated charging time.

In step S506, the communication control unit 115 performs the PPS communication with the charger 300 via the connection unit 101. The communication control unit 115 receives the request voltage calculated in step S505 from the charge control unit 102 and transmits the request voltage to the charger 300 by the PPS communication.

In step S507, the charge control unit 102 receives power supplied from the charger 300 and charges the battery 103.

In step S508, the charge control unit 102 starts time measurement by the timer 116. The timer 116 is used to measure the time from the PPS communication to the next PPS communication.

In step S509, the charge control unit 102 reads a time threshold corresponding to the current battery voltage from the internal memory 117. The current method of acquiring the battery voltage is as described in step S505.

Here, a table of the current battery voltage and the time threshold will be described. In the first embodiment, the communication interval of the PPS is determined in accordance with the gradient of the charging curve as follows.

If the charging curve that the electronic device 100 should follow at the time of the CCCV charging is known, the current position in the charging curve is uniquely determined by using the current battery voltage, and the gradient of the charging curve is also uniquely determined. Therefore, the communication interval of the PPS to be set is uniquely determined, and the time threshold is set in order to perform the PPS communication at this communication interval. For example, when the PPS communication is performed at 1 second intervals, the time threshold may be set to 1 second. For this table, it is possible to change the time threshold according to the gradient of the charging curve. For example, when the gradient of the charging curve becomes steep, the time threshold can be reduced. Thus, the communication interval can be narrowed in a period where the gradient is steep. However, in order to comply with the PPS standard, the time threshold needs to be set to a value of 10 seconds or less.

As described above, the table of time thresholds for the current battery voltage may be defined. FIG. 6 shows an example of the table of the request voltages and the time thresholds for the battery voltages. In order to charge the battery, the request voltage is set to a value larger than the battery voltage. The request voltage changes according to the value of the battery voltage, and in one table, the request voltage is uniquely determined with respect to the battery voltage. Further, in the period around the start of the charging where the gradient of the charging curve is steep and when the battery voltage is low, the time threshold is set to a small value such as 0.1 second, and the communication interval can be narrowed. Conversely, in the period around the end of the charging where the gradient of the charging curve is gentle and when the battery voltage is high, the time threshold is set to a large value such as 5 seconds, and the communication interval can be widened. In either case, the time threshold is set to a value of 10 seconds or less.

Referring back to FIG. 5, in step S510, the charge control unit 102 updates the time threshold based on the value read in step S509.

In step S511, the charge control unit 102 determines whether or not the time measured by the timer 116 exceeds a time threshold. If the charge control unit 102 determines that the time measured by the timer 116 does not exceed the time threshold, the charge control unit 102 returns the process 500 to step S509. If the charge control unit 102 determines that the time measured by the timer 116 exceeds the time threshold, the charge control unit 102 returns the process 500 to step S502.

Figures 7A, 7B:
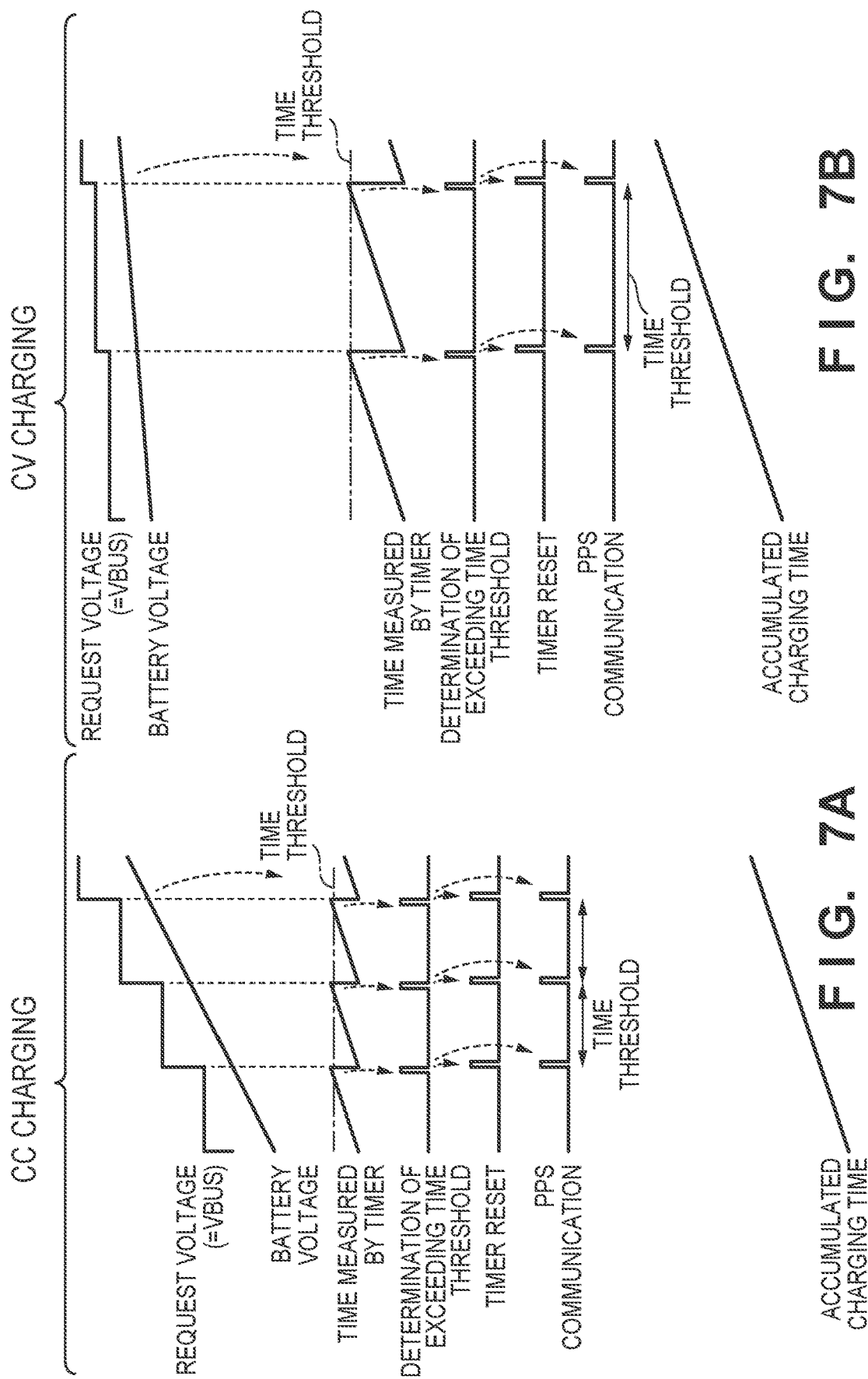
FIGS. 7A and 7B are time charts illustrating an example of an operation when the CCCV charging is performed according to one embodiment.

FIGS. 7A and 7B are a time chart of a control process when the battery 103 is charged. FIG. 7A shows a time chart when the CC charging with narrow communication intervals is performed. FIG. 7B shows a time chart when the CV charging with wide communication intervals is performed.

In FIG. 7A, when the charging is performed by the VBUS voltage supplied from the charger 300 and the battery voltage rises, the time measured by the timer 116 gradually increases. When the predetermined time has elapsed, the timer measurement time exceeds the time threshold, and the charge control unit 102 determines that the timer measurement time exceeds the time threshold. When the time threshold is exceeded, the PPS communication is performed, and the communication control unit 115 notifies the charger 300 of the request voltage, whereby the VBUS voltage is updated. At this time, the timer 116 is reset, and the time measurement is started again from zero. The accumulated charging time is continuously increased monotonically because the measurement time by the timer 116 is sequentially added. The time threshold is calculated based on the battery voltage. Although the time threshold is constant in FIG. 7A, the time threshold is also updated when the battery voltage changes and the gradient of the charging curve changes.

FIG. 7B is a time chart during the CV charging period in which the time threshold is updated to a larger value. In this case, the gradient of the charging curve becomes gentle. In FIG. 7B, since the time threshold is updated to a larger value, the time until the timer measurement time exceeds the time threshold is longer than that in the CC charging in FIG. 7A. After the charge control unit 102 determines that the time threshold has been exceeded, the PPS communication is performed to update the VBUS voltage, and the timer 116 is reset to resume the time measurement from zero.

As described above, according to the first embodiment, the communication interval of the PPS is variably controlled based on the battery voltage when the charging of the battery 103 is started and the accumulated charging time after the charging of the battery 103 is started, whereby the charging time in the CCCV charging by the PPS can be shortened.

Second Embodiment

Next, a control process when the battery 103 is charged will be described with reference to FIGS. 8 and 9. In the second embodiment, process 800 is added to the process 500 of FIG. 5. The process 800 includes a process of selecting a table of the request voltage and the time threshold for the battery voltage according to the information of the battery 103, and a process of changing a calculation method of the request voltage when the difference between the predicted battery voltage and the current battery voltage is large.

The process 800 of FIG. 8 is performed when the charge control unit 102 determines in step S502 of FIG. 5 that the battery voltage of the battery 103 does not exceed the charging completion threshold.

First, a table selection process in the second embodiment will be described. As described in the first embodiment, the charge control unit 102 determines the request voltage and the time threshold by referring to the table of the request voltage with respect to the battery voltage and the table of the time threshold with respect to the battery voltage stored in the internal memory 117. This is based on the fact that, if the value of the battery voltage is uniquely determined, the request voltage is uniquely determined, the gradient of the charging curve is uniquely determined, and the time threshold is uniquely determined when the charging curve to follow the CCCV charging is known as the electronic device 100. However, the charging curve when performing an actual CCCV charging is not necessarily constant. For example, in the case of a degraded battery, the capacity value is smaller than that of a non-degraded battery, and the battery voltage when compared with a battery having the same capacity is smaller. As a result, the charging curve changes. Therefore, a more appropriate table can be selected by storing a plurality of tables in the internal memory 117 according to a degree of degradation of the battery, instead of limiting the table of the request voltage with respect to the battery voltage and the table of the time threshold to one type. As a selection criterion of the table, the degree of degradation of the battery may be detected by periodically acquiring a battery voltage, and when it is determined that the battery is a degraded battery, the battery 103 may be charged using a table for the degraded battery. The table may be selected at the start of the charging, but the table may be periodically re-selected in consideration of the possibility of a degraded battery on the way.

Next, a control process when the CC charging is performed will be described with reference to a flowchart of FIG. 8. The process 800 of FIG. 8 is performed when the charge control unit 102 determines in step S502 of FIG. 5 that the battery voltage of the battery 103 does not exceed the charging completion threshold.

In step S801, the charge control unit 102 determines whether or not it is a timing of acquiring the degree of degradation of the battery 103. The degradation degree is acquired at the start of charging and at a preset predetermined timing. The predetermined timing is, for example, a case where switching from the CC charging to the CV charging is performed. When the charge control unit 102 determines that the timing is a degradation degree acquisition timing, the charge control unit 102 advances the process 800 to step S802, and when the charge control unit 102 determines that the timing is not the degradation degree acquisition timing, the charge control unit 102 ends the process 800 and advances the process to step S503.

In step S802, the charge control unit 102 acquires the degradation degree of the battery 103. As a method of acquiring the degradation degree, if the battery 103 has information of the degradation degree and can communicate with the battery 103, the charge control unit 102 communicates with the battery 103 to acquire the degradation degree information. When the battery 103 does not have the information of the degradation degree, an internal resistance of the battery 103 may be calculated by detecting the voltage and the current output from the battery 103 using the voltage detection unit 104 and the current detection unit 118. Since the internal resistance of the degraded battery increases, the degradation degree can be determined from the calculated internal resistance.

In steps S803 to S809, the charge control unit 102 determines which range the degradation degree of the battery 103 is within, and selects a table corresponding to the determined range.

In step S803, the charge control unit 102 determines whether the degradation degree of the battery 103 is smaller than the degradation threshold 1. If it is determined that the degradation degree of the battery 103 is smaller than the degradation threshold 1, the charge control unit 102 advances the process 800 to step S806. If it is not determined that the degradation degree of the battery 103 is smaller than the degradation threshold 1, the charge control unit 102 advances the process 800 to step S804.

In step S804, the charge control unit 102 determines whether or not the degradation degree of the battery 103 is smaller than the degradation threshold 2. If it is determined that the degradation degree of the battery 103 is smaller than the degradation threshold 2, the charge control unit 102 advances the process 800 to step SS807. If it is not determined that the degradation degree of the battery 103 is smaller than the degradation threshold 2, the charge control unit 102 advances the process 800 to step S805.

In step S805, the charge control unit 102 determines whether or not the degradation degree of the battery 103 is smaller than the degradation threshold 3. If it is determined that the degradation degree of the battery 103 is smaller than the degradation threshold 3, the charge control unit 102 advances the process 800 to step S808. If it is not determined that the degradation degree of the battery 103 is smaller than the degradation threshold 3, the charge control unit 102 advances the process 800 to step S809.

In step S806, the charge control unit 102 reads the request voltage table 1 for the battery voltage and the time threshold table 1 for the battery voltage from the internal memory 117, and advances the process 800 to step S503.

In step S807, the charge control unit 102 reads the request voltage table 2 for the battery voltage and the time threshold table 2 for the battery voltage from the internal memory 117, and advances the process 800 to step S503.

In step S808, the charge control unit 102 reads the request voltage table 3 for the battery voltage and the time threshold table 3 for the battery voltage from the internal memory 117, and advances the process 800 to step S503.

In step S809, the charge control unit 102 reads the request voltage table 4 for the battery voltage and the time threshold table 4 for the battery voltage from the internal memory 117, and advances the process 800 to step S503.

In the process 500 after step S503, the selected table is used.

In this manner, a plurality of tables are stored, and an appropriate table is selected in accordance with the battery information, whereby high-speed charging in accordance with an actual charging curve can be performed without waste.

In the second embodiment, the example of the degradation degree is described as the battery information serving as a basis for table selection, but the table selection may be performed based on other battery information such as the internal resistance of the battery 103, the battery voltage, and the battery current.

Next, the process of comparing the predicted battery voltage and the current battery voltage in the second embodiment will be described.

As described in the first embodiment, if the current battery voltage is known, the position in the ideal charging curve is uniquely determined. However, the actual charging curve changes depending on the current supplied from the charger 300, and the current changes depending on the power supply capability to the charger 300. The reason why the power supply capability changes may be, for example, a change in temperature of the charger 300, a change in load current of a device different from the electronic device 100 when the charger 300 can supply power to a plurality of devices, or the like. In the second embodiment, the battery voltage is acquired at a predetermined timing in order to detect that the actual charging curve deviates from the ideal charging curve. The predetermined timing is a timing equal to or longer than the communication interval of the PPS communication. The battery voltage acquired at the predetermined timing is compared with the predicted battery voltage, and when the difference from the predicted battery voltage is large, the acquired battery voltage is updated as the initial battery voltage, and the accumulated charging time is also reset. Then, the charging of the battery 103 is resumed with the battery voltage acquired at the predetermined timing as the charging start timing. Thus, even when the power supply capability to the charger 300 changes and the actual charging curve deviates from the ideal charging curve, the current battery voltage can be periodically acquired and corrected to the correct request voltage. The method of acquiring the predicted battery voltage is as described in step S505 of FIG. 5 of the first embodiment.

Next, a process of comparing the predicted battery voltage and the current battery voltage in the second embodiment will be described with reference to a flowchart of FIG. 9. The process 900 of FIG. 9 is performed after step S504 of FIG. 5.

In step S901, the charge control unit 102 determines whether or not an acquisition timing of the voltage of the battery 103 is reached. The voltage of the battery 103 may be acquired at a predetermined timing equal to or longer than the communication interval of the PPS communication as described above. For example, the timer 116 may determine whether or not the measurement time from the previous battery voltage acquisition exceeds a threshold. If it is determined that it is a voltage acquisition timing of the battery 103, the charge control unit 102 advances the process 900 to step S903. When it is determined that it is not the voltage acquisition timing of the battery 103, the charge control unit 102 ends the process 900 and advances the process to step S505 in FIG. 5.

In step S902, the voltage detection unit 104 acquires the battery voltage.

In step S903, the charge control unit 102 calculates a difference between the current battery voltage acquired in step S903 and the predicted battery voltage, and determines whether or not the calculated difference is greater than a threshold. If the calculated difference is greater than the threshold, the charge control unit 102 determines that the current battery voltage deviates significantly from the predicted battery voltage, and advances the process 900 to step S904. If the calculated difference is equal to or less than the threshold, the charge control unit 102 ends the process 900 and advances the process to step S505 in the process 500 of FIG. 5.

In step S904, the charge control unit 102 resets the accumulated charging time.

In step S905, the charge control unit 102 updates the initial battery voltage value to the battery voltage acquired in step S902.

By the process in steps S904 to S905, the battery voltage acquired in step S902 becomes new charging start timing, and the difference between the current battery voltage and the predicted battery voltage can be corrected.

Note that although the difference between the battery voltage and the predicted battery voltage is calculated in FIG. 9 in order to confirm whether or not the power supply capacity of the charger 300 is changed in the second embodiment, another method may be used. For example, it is also possible to acquire the charging current at a predetermined timing using the current detection unit 118 and acquire a change amount of charging current using the current change amount detection unit 119. When the change amount of current is equal to or greater than a threshold, a reference table may be corrected in accordance with the change amount of current, or a previously corrected table may be stored in the internal memory 117 to change the reference table.

According to the second embodiment, by selecting an appropriate table in accordance with the degradation degree of the battery 103, and correcting the request voltage in accordance with the comparison between the predicted battery voltage and the current battery voltage, it is possible to perform high-speed CCCV charging based on the actual charging curve in the CCCV charging by the PPS.

Third Embodiment

Figure 10:
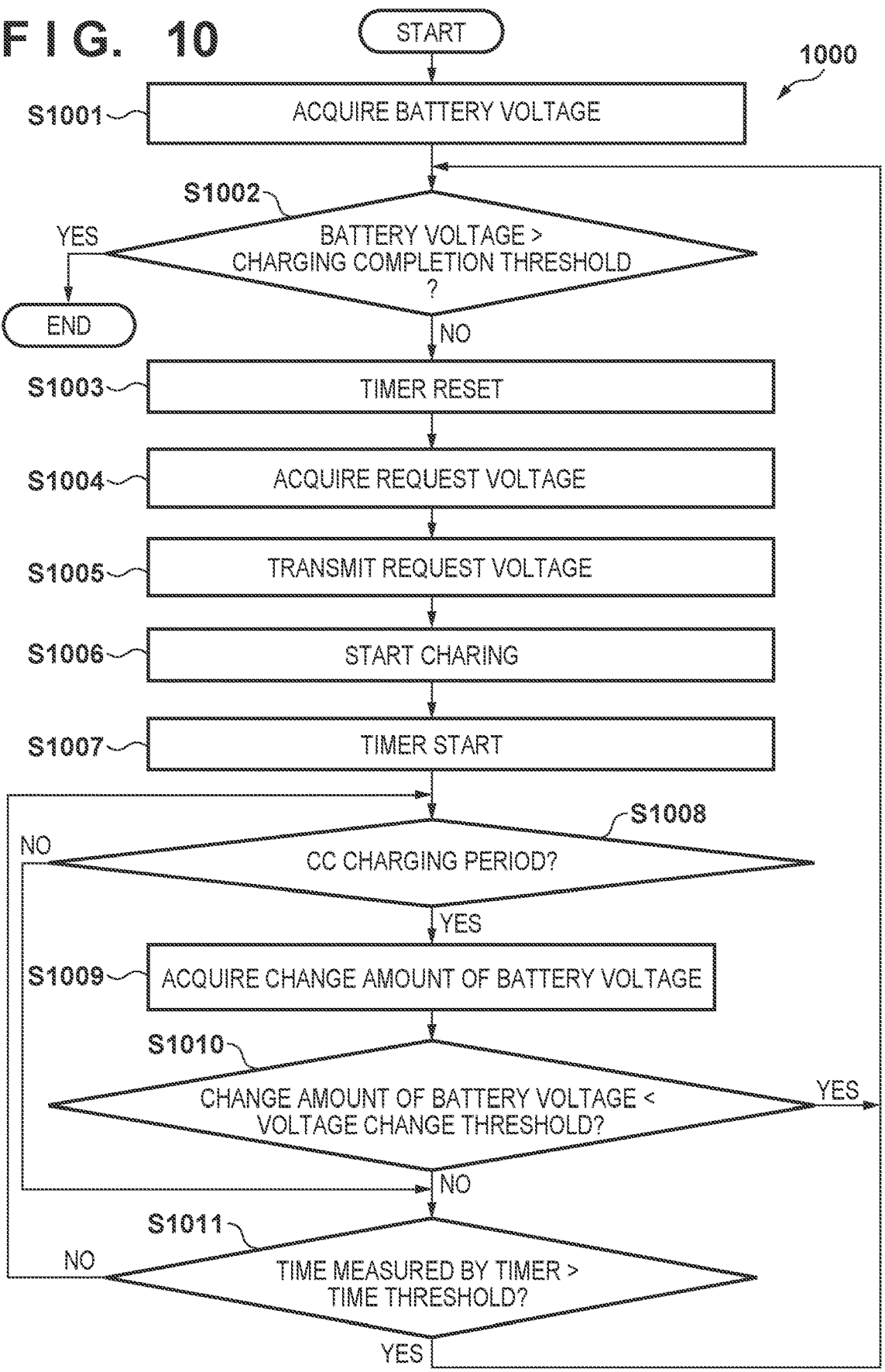
FIG. 10 is a flowchart illustrating an example of a control process when the CCCV charging is performed according to one embodiment.

Next, a control process of the electronic device 100 according to the third embodiment will be described with reference to a flowchart of FIG. 10.

In the first embodiment, the communication interval of the PPS is determined by reading the time threshold corresponding to the current battery voltage. On the other hand, in the third embodiment, when it is detected that a change amount of battery voltage is small, the PPS communication is performed in a shorter time than the communication interval defined by the PPS standard.

Since steps S1001 to S1007 are the same as steps S501 to S508 in the process 500 of FIG. 5 except for a part thereof, descriptions thereof will be omitted. The difference between steps S1001 to S1007 and steps S501 to S508 is that the update of the accumulated charging time performed in step S503 in the process 500 of FIG. 5 is not performed in the third embodiment. In the third embodiment, since the battery voltage is acquired for each PPS communication and the predicted battery voltage is not calculated using the accumulated charging time, the accumulated charging time is unnecessary.

In step S1008, the charge control unit 102 determines whether it is in the CC charging period or the CV charging period, when it is determined that it is in the CC charging period, advances the process 1000 to step S1009, when it is determined that it is in the CV charging period, advances the process 1000 to step S1011. In the third embodiment, the PPS communication interval is determined from a change amount of battery voltage during the CC charging period, and the PPS communication is performed during the CV charging period at the communication interval (10 seconds) defined by the PPS standard. Therefore, in step S1008, it is determined whether it is in the CC charging period or the CV charging period.

In step S1009, the voltage change amount detection unit 114 calculates a change amount of battery voltage. The voltage change amount detection unit 114 calculates a value obtained by differentiating the battery voltage continuously acquired by the voltage detection unit 104 with respect to a time to obtain the change amount of battery voltage.

In step S1010, the charge control unit 102 determines whether or not the change amount of battery voltage calculated in step S1009 is smaller than a predetermined voltage change threshold. If it is determined that the change amount of battery voltage calculated in step S1009 is smaller than the voltage change threshold, the charge control unit 102 returns the process 1000 to step S1002. If it is not determined that the change amount of battery voltage calculated in step S1009 is smaller than the voltage change threshold, the charge control unit 102 advances the process 1000 to step S1011.

In step S1011, the charge control unit 102 determines whether or not the time measured by the timer 116 exceeds a time threshold (10 seconds). If it is determined that the time measured by the timer 116 does not exceed 10 seconds, the charge control unit 102 returns the process 1000 to step S1008. If it is determined that the time measured by the timer 116 exceeds 10 seconds, the charge control unit 102 returns the process 1000 to step S1002.

Figures 11A, 11B:
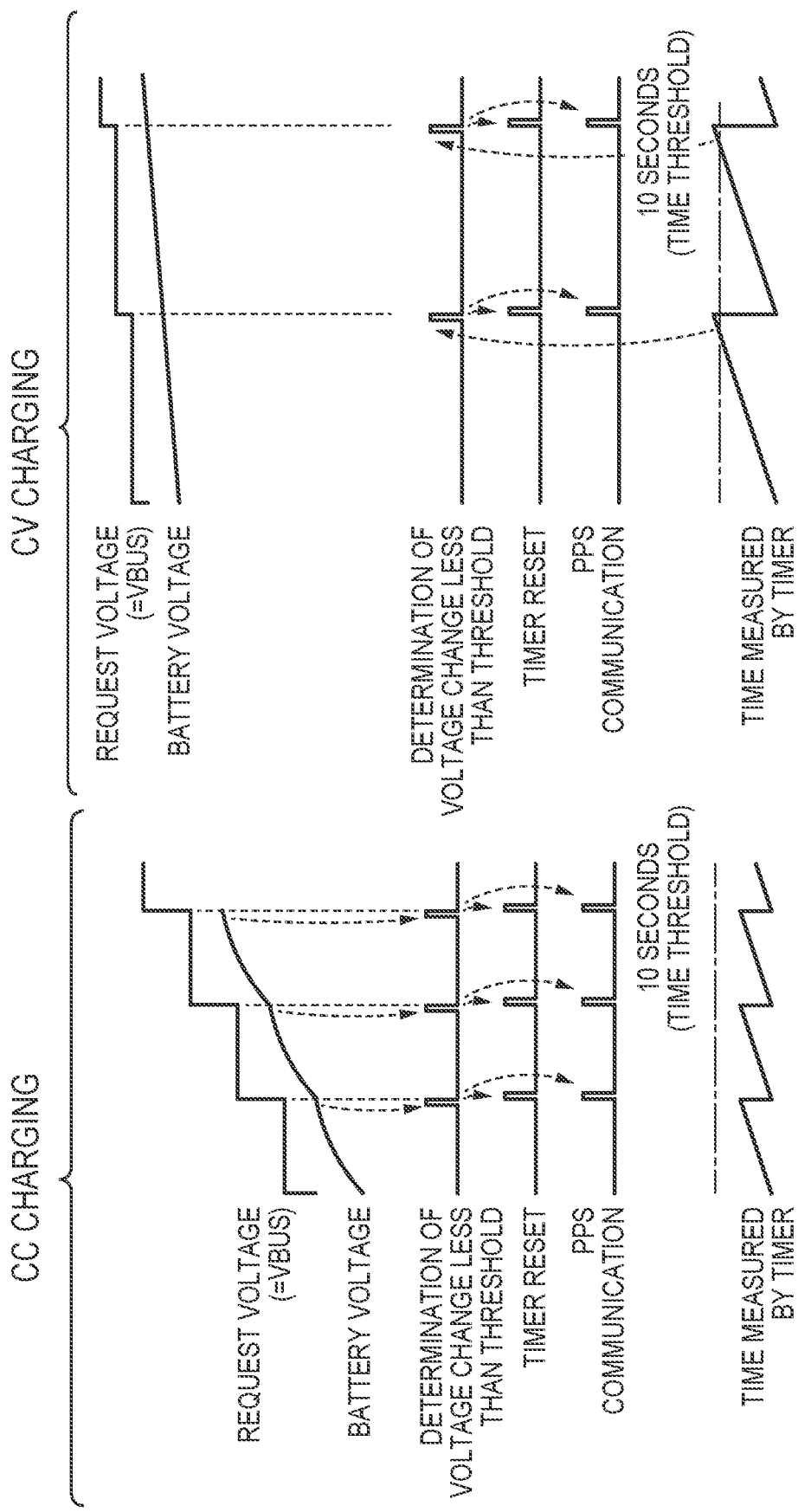
FIGS. 11A and 11B are time charts illustrating an example of an operation when the CCCV charging is performed according to one embodiment.

FIGS. 11A and 11B are time charts showing an operation when the CCCV charging is performed. FIG. 11A shows a time chart when the CC charging is performed. FIG. 11B shows a time chart when the CV charging is performed.

During the CC charging period shown in FIG. 11A, the charging is performed by the VBUS voltage supplied from the charger 300, and when the battery voltage rises, the change amount of battery voltage becomes smaller as time elapses immediately after switching the VBUS voltage. This is because the potential difference between the VBUS voltage and the battery voltage becomes small and the battery voltage starts to be saturated. Therefore, in the third embodiment, the communication interval of the PPS is determined from the change amount of battery voltage during the CC charging period. More specifically, in the CC charging period, when the change amount of battery voltage exceeds the threshold, the PPS communication is performed at the interval defined by the PPS standard, and when the change amount of battery voltage does not exceed the threshold, the PPS communication is performed at the communication interval shorter than the communication interval defined by the PPS standard.

During the CV charging period shown in FIG. 11B, since the gradient of the battery voltage is gentle immediately after the VBUS voltage is switched, it is difficult to determine the communication interval of the PPS by detecting that the voltage change is small. Even if the PPS communication is performed every 10 seconds during the CV charging period, the charging time does not extend significantly. Therefore, the communication interval of the PPS during the CV charging period is 10 seconds defined by the PPS standard.

According to the third embodiment, it is possible to shorten the charging time in the CCCV charging by determining the PPS communication interval from the change amount of battery voltage during the CC charging period.

Fourth Embodiment

Various kinds of functions, processes, or methods described in the first, second and third embodiments can also be realized by a personal computer, a microcomputer, a CPU (Central Processing Unit), or the like with a program. In a fourth embodiment, a personal computer, a microcomputer, a CPU, or the like will be called a "computer X" below. In the fourth embodiment, a program for controlling the computer X and realizing various kinds of functions, processes, or methods described in the first, second and third embodiments will be called a "program Y".

Various kinds of functions, processes, or methods described in the first, second and third embodiments are realized by the computer X executing the program Y. In this case, the program Y is supplied to the computer X via a computer-readable storage medium. The computer-readable storage medium according to the fourth embodiment includes at least one of a hard disk device, a magnetic storage device, an optical storage device, a magneto-optical storage device, a memory card, a volatile memory (e.g., random access memory), a non-volatile memory (e.g., read only memory), or the like. The computer-readable storage medium according to the fourth embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims the benefit of Japanese Patent Application No. 2019-217499, filed Nov. 29, 2019, which is hereby incorporated by reference herein in its entirety.

What is claimed is:
1. An electronic device comprising:
a CPU;
a memory storing a program which, when executed by the CPU, causes the CPU to function as:
a charging unit that charges a battery with power supplied from an external device;
a communication unit that communicates with the external device; and
a control unit that controls the communication unit to perform a predetermined communication for requesting a change of power to be supplied to the electronic device in a case where the battery is being charged by the charging unit, wherein the control unit controls the communication unit such that an interval of performing the predetermined communication from a start of charging the battery by the charging unit until a battery voltage exceeds a predetermined threshold is shorter than an interval of performing the predetermined communication after the battery voltage exceeds the predetermined threshold, in a case where the battery is being charged by the charging unit.

2. The electronic device according to claim 1, wherein the program, when executed by the CPU, further causes the CPU to function as a voltage detection unit that detects the battery voltage, wherein the control unit determines the interval based on a battery voltage detected by the voltage detection unit, and the control unit controls the communication unit to transmit a power request of a predetermined voltage to the external device in the predetermined communication.

3. The electronic device according to claim 2, wherein the control unit determines the interval during the charging depending on a gradient of a charging curve when the battery is charged.

4. The electronic device according to claim 2, wherein the charging unit starts charging the battery with a constant current and then switches to charging with a constant voltage, and the control unit determines the interval so that the interval in a first period from the start of the charging by the constant current is shorter than the interval in a period after the first period in the charging by the constant current and the interval in the charging with the constant voltage.

5. The electronic device according to claim 2, wherein the charging unit starts charging the battery with a constant current and then switches to charging with a constant voltage, and the interval during the charging by the constant current is shorter than the interval during the charging by the constant voltage.

6. An electronic device comprising:
a CPU; and
a memory storing a program which, when executed by the CPU, causes the CPU to function as:
a charging unit that charges a battery with power supplied from an external device;
a communication unit that communicates with the external device; and
a control unit that controls the communication unit to perform a predetermined communication for requesting a change of power to be supplied to the electronic device in a case where the battery is being charged by the charging unit, wherein the control unit controls the communication unit so that an interval of performing the predetermined communication becomes a predetermined interval, in a case where a change amount of battery voltage exceeds a predetermined value in charging of the battery, and controls the communication unit so that an interval of performing the predetermined communication becomes shorter than the predetermined interval, in a case where the change amount of battery voltage does not exceed the predetermined value in charging of the battery.

7. A method comprising:
charging a battery by power supplied from an external device;
communicating with the external device; and
controlling the communicating to perform a predetermined communication for requesting a change of power to be supplied to the electronic device in a case where the battery is being charged by the charging, wherein the controlling controls the communicating such that an interval of performing the predetermined communication from a start of charging the battery until the battery voltage exceeds a predetermined threshold is shorter than an interval of performing the predetermined communication after the battery voltage exceeds the predetermined threshold, in a case where the battery is being charged by the charging.

8. A method comprising:
charging a battery by power supplied from an external device;
communicating with the external device;
controlling the communicating to perform a predetermined communication for requesting a change of power to be supplied to the electronic device in a case where the battery is being charged by the charging, wherein the controlling controls the communicating such that an interval of performing the predetermined communication becomes a predetermined interval, in a case where a change amount of battery voltage exceeds a predetermined value in charging of the battery; and controlling the communication unit such that an interval of performing the predetermined communication becomes shorter than the predetermined interval, in a case where the change amount of battery voltage does not exceed the predetermined value in charging of the battery.

* * * * *